United States Patent
Bauchspies

(10) Patent No.: US 10,534,952 B1
(45) Date of Patent: Jan. 14, 2020

(54) ABSOLUTE IDENTIFICATION

(71) Applicant: IDEX ASA, Fornebu (NO)

(72) Inventor: Roger A. Bauchspies, Gustine, CA (US)

(73) Assignee: IDEX ASA, Fornebu (NO)

( * ) Notice: Subject to any disclaimer, the term of this patent is extended or adjusted under 35 U.S.C. 154(b) by 0 days.

(21) Appl. No.: 15/454,931

(22) Filed: Mar. 9, 2017

(51) Int. Cl.
*G06K 9/00* (2006.01)

(52) U.S. Cl.
CPC ..... *G06K 9/00087* (2013.01); *G06K 9/00013* (2013.01)

(58) Field of Classification Search
CPC .......... G06K 9/00087; G06K 9/00013
See application file for complete search history.

(56) References Cited

U.S. PATENT DOCUMENTS

| 7,885,436 B2 | 2/2011 | Russo et al. |
| 2016/0026840 A1* | 1/2016 | Li ............... G06K 9/00013 348/77 |
| 2016/0125223 A1 | 5/2016 | Boshra et al. |

* cited by examiner

*Primary Examiner* — Ruiping Li
(74) *Attorney, Agent, or Firm* — Kilpatrick Townsend & Stockton LLP

(57) ABSTRACT

A system and method for providing a matching process that determines a conforming pattern match to a pattern-under-test from a set of matching patterns in a pattern storage. A matching process tests every template against the pattern-under-test and resolves a conforming match condition when multiple matches to the pattern-under-test are found. In some embodiments, a matcher engine using variable match thresholds may be used to differentiate among matching templates to identify a conforming-matching template with respect to the pattern-under-test.

9 Claims, 2 Drawing Sheets

ABSOLUTE IDENTIFICATION

FIELD OF THE INVENTION

The present invention relates generally to pattern matching, and more specifically, but not exclusively, to identification of a single conforming match of a template to a pattern-under-test when multiple templates of a trusted set of templates match the pattern-under-test.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Biometric pattern matching includes use of fingerprints to register or identify a user. A pattern-under-test is compared against some other pattern, such as a preregistered pattern retrieved from a pattern storage, which may include a trusted data storage. The comparison indicates a "match" or a "no match" condition with further processing dependent upon that condition. That further processing may result in access to additional resources, or enhanced access to existing resources, or a host of other consequences subsequent to the evaluation of matching or not matching.

In some systems, the pattern storage may include patterns from multiple sources of patterns. The multiple sources may include different patterns from one user (e.g., fingerprints from different fingers), different patterns from multiple users (index fingerprints of two or more users), or a combination of these examples, among other possibilities.

A system may perform a matching process in which a particular pattern-under-test is compared against the patterns in the pattern storage. This matching process could be implemented in serial fashion, selecting individual unique patterns from the pattern storage one at a time and then doing the comparison against the pattern-under-test. For some applications, it may be acceptable to stop the matching process upon a first match condition.

In other applications, such as absolute identification of a user or in some types of dynamic registration, suspending the matching process upon a first match may result in errors. It may be desirable to provide a matching process that determines a conforming pattern match to a pattern-under-test from a set of matching patterns in a pattern storage, including instances when multiple patterns match the pattern-under-test.

BRIEF SUMMARY OF THE INVENTION

Disclosed is a system and method for providing a matching process that determines a conforming pattern match to a pattern-under-test from a set of matching patterns in a pattern storage.

The following summary of the invention is provided to facilitate an understanding of some of the technical features related to decreasing a false acceptance rate in pattern matching processes that compare a pattern-under-test against a set of patterns retrieved from a pattern storage when that set of patterns includes multiple matching patterns, and is not intended to be a full description of the present invention. A full appreciation of the various aspects of the invention can be gained by taking the entire specification, claims, drawings, and abstract as a whole. The present invention is applicable to other patterns in addition to biometric patterns and to other biometric patterns in addition to fingerprints.

An embodiment of the present invention may include a matching process that compares a pattern-under-test against a set of patterns retrieved from a pattern storage wherein that set of patterns includes two or more patterns that match the pattern-under-test. The matching process may include testing each pattern from the pattern test at least once in a series of cycles of match evaluations, with each cycle increasing a match threshold until a single pattern is matched. That single pattern may indicate different conditions, or have different significance, depending upon the type of pattern data and matching system that implements this matching process.

An embodiment of the present invention may include a matching process that compares a pattern-under-test against a set of patterns retrieved from a pattern storage wherein that set of patterns includes two or more patterns that match the pattern-under-test. The matching process may include testing each pattern once with a matching engine that provides an indicator of a quality of match for each patter n in the set of patterns. The pattern with the highest quality of match, using a conformance standard or a conformance metric, may be identified as the single conforming matching pattern. That single pattern may indicate different conditions, or have different significance, depending upon the type of pattern data and matching system that implements this matching process.

A method for selecting a conformal match pattern template from a set of pattern templates that matches a pattern-under-test wherein the set of pattern templates include at least two templates that match the pattern-under-test using an initial match threshold and a conformance standard, including: a) identifying an initial set of matching templates from the set of pattern templates that match the pattern-under-test using a matching engine responsive to the initial match threshold and the conformance standard, wherein said initial set of matching templates includes more than one template from the set of pattern templates, said initial set of matching templates defining a previous set of matching templates and said initial match threshold defining a previous match threshold; b) identifying a subsequent set of matching templates from said previous set of matching templates using said matching engine responsive to a subsequent match threshold, said subsequent match threshold adjusted with respect to said previous match threshold responsive to the conformance standard; c) repeating step b) until a number of elements of said subsequent set of matching templates equals one and said subsequent set of matching templates includes a particular one template from the set of pattern templates, wherein said previous set of matching templates includes said subsequent set of matching templates from step b) when said number of elements of said subsequent set of matching templates is greater than one and said step b) is repeated, and wherein said previous match threshold includes said subsequent match threshold from step b) when said number of elements of said subsequent set of matching templates is greater than one and said step b) is repeated; and d) identifying said particular one template as the single conforming match pattern template.

A method for producing a conforming match pattern from a set of patterns that matches a pattern-under-test using a conformance standard, including: a) testing each pattern from the set of patterns for a match against the patternunder-test until an initial termination event occurs, said initial termination event including a first no-match mode having no pattern from the set of patterns matching the pattern-under-test or a first match mode having a first particular one pattern from the set of patterns matching the pattern-under-test and wherein a current particular one pattern includes said first particular one pattern; b) reporting, responsive to said initial termination event including said first no-match mode, the single conforming match pattern consists of a null pattern; c) testing, responsive to an immediately preceding termination event including one of said match modes, each untested pattern not tested in step a) for a match against the pattern-under-test until a subsequent termination event occurs, said subsequent termination event selected from one of a second match mode having a subsequent particular one pattern from the set of patterns matching the pattern-under-test and a second no-match mode having no untested pattern from the set of patterns matching the pattern-under-test wherein said subsequent particular one pattern is different than said first particular one pattern; d) determining, responsive to an immediately preceding termination event including said second match mode, which one of said subsequent particular one pattern and said current particular one pattern is a current conforming match to the pattern-under-test wherein said current particular one pattern consists of said current conforming match; e) repeating steps c) and d) until an immediately preceding termination event includes said second no-match mode; and f) reporting, responsive to an immediately preceding termination event including said second no-match mode, said current particular one pattern as the single conforming match pattern.

A method for producing a single conforming match pattern template from a set of pattern templates, the single conforming match pattern conforming matching a pattern-under-test, including: a) initializing a set parameters including a number M, a number N, and a number T with said number M representing a current conforming template match having an initial template number with a template value other than 1 through said number T, said number N representing an index, and said number T representing a number of the pattern templates in the set of pattern templates; b) retrieving a pattern-under-test P; c) testing whether said pattern-under-test P matches an Nth template to produce a first test state, with said first test state affirmative when P matches said Nth template and with said first test state negative when said P does not match said Nth template; d) testing, when said first test state is affirmative, whether said number M has said initial template value to produce a second test state, with said second test state affirmative when M has said initial template number and with said second test state negative when M has a value different from said initial template number; e) setting, when said first state and said second state are both affirmative, said number M equal to said number N; f) testing, when said first state is affirmative and said second state is negative, said pattern-under-test P against both said Mth template and said Nth template to determine a current conforming match with said current conforming match consisting essentially of said Mth template when said Mth template matches said pattern-under-test P better than said Nth template and with said current conforming match consisting essentially of said Nth template when said Nth template matches said pattern-under-test P better than said Mth template, wherein said number M is set consisting essentially of said current conforming match; g) incrementing, after step c) when said first state is negative, after step e), and after f), said number N by one to produce an incremented number N; h) testing whether said incremented number N is greater than said number T to produce a third test state with said third test state negative when said incremented number N is not greater than said number T and with said third test state affirmative when said incremented number N is greater than said number T; i) repeating, when said third test state is negative, step c) through step h); and thereafter j) reporting, when said third test state is affirmative and when said number M consists essentially of a value other than said initial template number, said number M as the single conforming match pattern template.

A non-transitory computer-readable medium for selecting a conformal match pattern template from a set of pattern templates that matches a pattern-under-test wherein the set of pattern templates include at least two templates that match the pattern-under-test using an initial match threshold and a conformance standard, including instructions stored thereon, that when executed on at least one processor, perform the steps of a) identifying an initial set of matching templates from the set of pattern templates that match the pattern-under-test using a matching engine responsive to the initial match threshold and the conformance standard, wherein the initial set of matching templates includes more than one template from the set of pattern templates, the initial set of matching templates defining a previous set of matching templates and the initial match threshold defining a previous match threshold; b) identifying a subsequent set of matching templates from the previous set of matching templates using the matching engine responsive to a subsequent match threshold, the subsequent match threshold adjusted with respect to the previous match threshold responsive to the conformance standard; c) repeating step b) until a number of elements of the subsequent set of matching templates equals one and the subsequent set of matching templates includes a particular one template from the set of pattern templates, wherein the previous set of matching templates includes the subsequent set of matching templates from step b) when the number of elements of the subsequent set of matching templates is greater than one and the step b) is repeated, and wherein the previous match threshold includes the subsequent match threshold from step b) when the number of elements of the subsequent set of matching templates is greater than one and the step b) is repeated; and d) identifying the particular one template as the single conforming match pattern template.

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Figure 1:
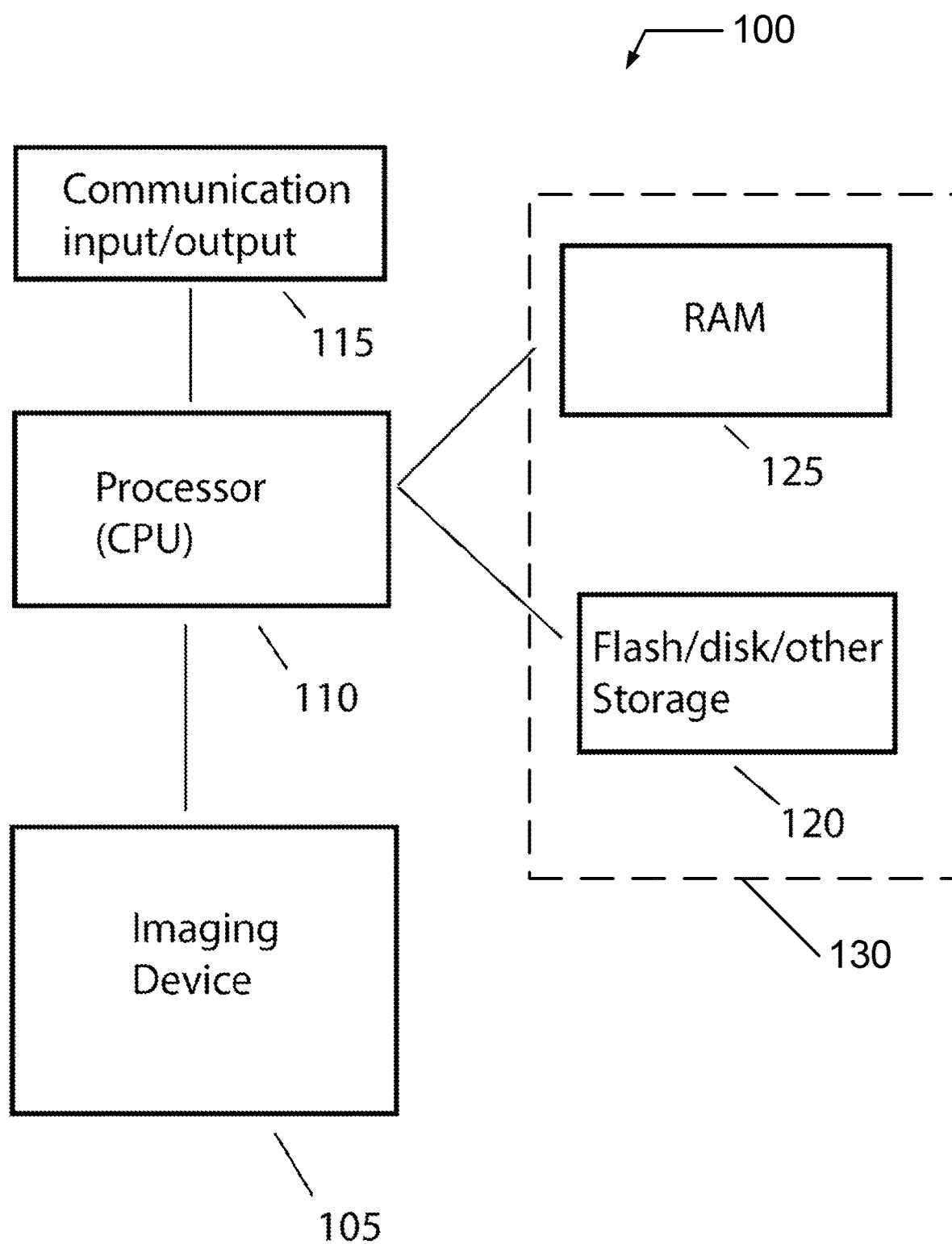
FIG. 1 illustrates a block schematic diagram of an embodiment for a pattern matching system.

Embodiments of the present invention provide a system and method for providing a matching process that determines a conforming pattern match to a pattern-under-test from a set of matching patterns in a pattern storage. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Definitions

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

The following definitions apply to some of the aspects described with respect to some embodiments of the invention. These definitions may likewise be expanded upon herein.

As used herein, the term "or" includes "and/or" and the term "and/or" includes any and all combinations of one or more of the associated listed items. Expressions such as "at least one of," when preceding a list of elements, modify the entire list of elements and do not modify the individual elements of the list.

As used herein, the singular terms "a," "an," and "the" include plural referents unless the context clearly dictates otherwise. Thus, for example, reference to an object can include multiple objects unless the context clearly dictates otherwise.

Also, as used in the description herein and throughout the claims that follow, the meaning of "in" includes "in" and "on" unless the context clearly dictates otherwise. It will be understood that when an element is referred to as being "on" another element, it can be directly on the other element or intervening elements may be present therebetween. In contrast, when an element is referred to as being "directly on" another element, there are no intervening elements present.

As used herein, the term "set" refers to a collection of one or more objects. Thus, for example, a set of objects can include a single object or multiple objects. Objects of a set also can be referred to as members of the set. Objects of a set can be the same or different. In some instances, objects of a set can share one or more common properties.

As used herein, the term "adjacent" refers to being near or adjoining. Adjacent objects can be spaced apart from one another or can be in actual or direct contact with one another. In some instances, adjacent objects can be coupled to one another or can be formed integrally with one another.

As used herein, the terms "connect," "connected," and "connecting" refer to a direct attachment or link. Connected objects have no or no substantial intermediary object or set of objects, as the context indicates.

As used herein, the terms "couple," "coupled," and "coupling" refer to an operational connection or linking. Coupled objects can be directly connected to one another or can be indirectly connected to one another, such as via an intermediary set of objects.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%.

As used herein, the terms "substantially" and "substantial" refer to a considerable degree or extent. When used in conjunction with an event or circumstance, the terms can refer to instances in which the event or circumstance occurs precisely as well as instances in which the event or circumstance occurs to a close approximation, such as accounting for typical tolerance levels or variability of the embodiments described herein.

As used herein, the terms "optional" and "optionally" mean that the subsequently described event or circumstance may or may not occur and that the description includes instances where the event or circumstance occurs and instances in which it does not.

As used herein, the term "fingerprint" means a map of contrasting amplitude elements from a pattern source. As such, a ridge/furrow pattern on a human finger is included as a fingerprint. Additionally, zebra stripe patterns, retinal vein patterns, or other collections of contrasting amplitude elements having a set of a plurality of sufficiently long succession of similarly contrasted elements.

As used herein, the terms "correlate," "correlating," and "correlated" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression without a match between the first pattern and the second pattern. Correlation is found by matching intermediate patterns that provide a bridge between the first pattern and the second pattern. For example, a second pattern may not match the first pattern, but may match a third pattern, with the third pattern matching the first pattern. Correlation may be found by one or more intermediate matches between the second pattern and the first pattern.

As used herein, the terms "match," "matching," and "matches" refer to a conclusion of a comparison of a first pattern (e.g., a first image portion of a first impression from a sensor) against a second pattern (e.g., a second image portion of a second impression from the sensor) that means that a pattern source used in the first impression is the same pattern source, within a sufficient confidence interval appropriate to the application, used in the second impression. A match does not require 100% commonality of features between the first and second patterns. One hundred percent, and nearly 100% (for example 95% commonality—depending upon application), commonality is referred to as a duplicate image. This results when the user places the same portion of the same finger on the sensor from two or more impressions. Sometimes a match is a determination from a matcher process or matcher engine, which can have a particular special meaning, and may include correlation comparisons. Some embodiments of the present invention include just such a matcher process. However, the present invention is not constrained to determining matches in this fashion; the present invention includes use of an alignment engine for evaluating the condition of a match or a non-match between comparisons of a set of patterns.

As used herein, the term "conforming match" refers to a comparison of multiple patterns against a conformance standard, e.g., a specific predetermined ranking standard). That specific predetermined conformance standard may include a ranking characteristic that is applicable for any particular matching process, a set of related matching processes (e.g., use of the same multiple patterns), or a set of unrelated matching processes (e.g., comparing a trusted set of patterns against multiple different patterns-under-test), for example a best match, a worst match, a most average match, a least matching, a most matching, or the like. In other cases, some other non-ranking standard may be used in addition or alternatively to a ranking standard.

As used herein, the terms "near realtime" refers to a practicality of a time delay introduced, by automated data processing or data transmission, between an occurrence of an event of receiving a pattern impression from application of a pattern source to a pattern impressioner (e.g., an imager to create a bitmap image of a portion of a pattern associated the pattern source) and the subsequent processing of data for that pattern impression (e.g., a bitmap image), such as for display, feedback, or control purposes. Depending upon a processing speed, it may be possible to make multiple pattern impressions before a first pattern impression is processed. Some embodiments of the present invention process serial pattern impressions from a user in realtime or near realtime which may be considered equivalent when the processing delay is imperceptible to a user. For realtime, and near realtime embodiments, it is considered that pattern impressions are taken and processed serially, that is an impression and processing/feedback is provided before a next following pattern impression is processed.

In general, a pattern source (e.g., a finger) may include a pattern (e.g., a fingerprint). For a system that does not process the pattern (fingerprint) directly, the system may process a representation (e.g., a pattern map) of the pattern (fingerprint). When a user uses an impressioner (e.g., places a pattern source (finger) on a sensor or imager or other impression producing structure), the system may produce an impression (e.g., an image) of a portion of the pattern (fingerprint) of the pattern source (finger) of the user. After registration, during operation when receiving pattern information, the system and method may not, and typically does not, have a priori knowledge that an incoming set of pattern information is in fact from the pattern. To reflect this, any pattern providing the incoming set of pattern information may be referred to as a pattern-under-test. Impressions (images) may be collected and evaluated, in bulk or in realtime or in near realtime from one or more patterns-under-test depending upon a particular implementation.

The pattern storage includes a set of stored patterns that are tested against during system operation. For some implementations, the matching system may be configured to test whether the pattern-under-test matches any pattern of the set of stored patterns. In that configuration, the matching system may stop upon detection of a first match condition.

In some cases, such a configuration for a matching system may produce degraded, or erroneous results. For example, a dynamic registration system, e.g., where one or more trusted images are written or registered into a trusted database/memory during operation, may accept multiple fingerprints from a single user or may have multiple patterns from the same finger. Some systems may include patterns from multiple users and the system may wish to discriminate based upon particular individuals. These are examples where it may be desirable to reduce a false acceptance and not proceed with post-match activities based solely upon a first match condition.

Depending upon details of the implementation and the structure and intended use of the system, there may be several instances in which a there could be multiple different patterns of a trusted database that match to a pattern-under-test. In one case, a match threshold of a match engine may be too low and the first match is not the best match. In the event that the system then processes the first match, such as evolving a dynamic seed, enhancing a composite pattern built from matching patterns, or some dynamic adjustment to the trusted database, those evolutions, enhancement, and/or adjustments may be degraded by use of a sub-par match.

In another case, an operator may register multiple patterns into a trusted database e.g., a left index finger and a right index finger, where each pattern may be associated with a different set of access rights, in this case the left index finger granting some superior access right. When a pattern-under-test may match both index finger patterns, if the operator has submitted a pattern of the right index finger for test but the system performs a comparison against the left index finger first, the first match pass condition would erroneously grant the superior access right even though the pattern-under-test better matches the pattern with a more restrictive access right.

In these cases, an embodiment may determine which pattern from the set of patterns conformably matches the pattern-under-test (e.g., when the conformance standard includes a ranked "best" standard). There may several different ways to do this. For example, some matching processes or match engines may implement a concept referred to as a variable match threshold. A variable match threshold may include operating the match process or match engine with more extensive, expansive, enhanced, stricter, or the like, match conditions. As the match threshold increases, matching one pattern to another becomes more challenging as more conditions must be satisfied which reduces a number of stored patterns matching the pattern-under-test. This threshold may be quantified to provide a conformance metric, the value of the threshold when a pattern or a set of patterns meets and/or fails to meet the conformance standard.

Operating the match process or match engine with a very high threshold for all pattern tests may needlessly extend the time required to complete the testing or may require too many resources which may needlessly increase price, resource costs, or other user costs. A variable threshold may allow the matching process or matching engine to quickly filter out an initial set of matching patterns using a lower or less restrictive match threshold. The system may then iterate through additional match cycles in which each set of matching patterns is tested again using an increased threshold. Eventually a single pattern will match using the conformance standard that may be identified as the conforming matching pattern. In an event that a threshold increase from one cycle to a subsequent cycle eliminates all the matching patterns, the cycle may be repeated with a smaller threshold increase.

In some cases, a matching process or matching engine, may be able to calculate, determine, evaluate, create, produce or otherwise provide a match quality metric for each comparison. Each pattern in the pattern source may be compared against the pattern-under-test to assign the match quality metric for each pattern in the pattern storage. Thereafter the pattern with the greatest match quality metric could be identified as the single conforming matching pattern.

In some cases, a hybrid solution may include the match quality metric to identify a set of matching patterns (e.g., those N number of patterns that have the highest match quality metric) and thereafter subject those N number of patterns to the iterative cycle of increasing match threshold to establish a single conforming matching pattern.

As noted herein, the significance of having identified the single conforming matching pattern from the patterns of the pattern storage may vary. For example, in a dynamic registration context, a single conforming matching pattern may indicate which pattern (e.g., which finger) is the conforming match or which pattern may be dynamically updated or associated with the new information. In a multiple user context, the single conforming matching pattern may disambiguate between different users. In a multiple pattern from multiple user implementation, the single conforming matching pattern may indicate which finger of which user conformably matches the pattern-under-test.

For example, a user may associate an index finger with standard user access rights to a computing system and that user may associate a ring finger with administrative user access rights to that computing system. Different users may have different rights to different computing systems, and an embodiment of the present invention may afford each user with the proper rights for the proper computing system. Different implementations and embodiments may provide different and/or additional significance to identification of a pattern-under-test to a single conforming matching pattern from a set of patterns, a subset of these patterns match the pattern-under-test.

As the number of patterns stored in the pattern storage increases, and as the set of patterns include matches with small variations compared to each other, it may become more important to identify the single conforming matching pattern.

FIG. 1 illustrates a block schematic diagram of an embodiment for a pattern matching system 100. System 100 includes an imaging device 105, a processor 110, an input/output (I/O) system 115, a nonvolatile memory 120 and a RAM memory 125, with memory 120 and memory 125 collectively defining a memory system 130. System 100 is described, in the disclosed embodiment, as a fingerprint matching system that may be used as a pattern (e.g., fingerprint) verification system, a pattern identification system, or other pattern processing system. In a fingerprint verification system, the system attempts to measure a correspondence between a pair of fingerprints (one-on-one) in order to establish, within some level of confidence, whether one pattern source (a finger) is the same or sufficiently close to another pattern source (a finger) that produces the other fingerprint. An identification system determines which pattern source (which finger belonging to which person) generated a particular fingerprint. A verification system may be used as an identification system when a decrease in power/speed is acceptable, given fixed resources. A verification system performs better as the quality of the registered images improves.

System 100 may function as a basic computer in implementing the present invention for accessing and processing fingerprints, fingerprint images, and sets of pattern information (e.g., curves) derived from a fingerprint as further described below. Processor 110 may include one or more central processing units (CPUs), selected from one or more of an x86, x64, ARM, or the like, architectures, connected to various other components, such as by a system bus.

Imaging device 105 produces an image of a fingerprint (an impression from an impressioner for example); either directly (e.g., it is a sensor or imager for a pattern source or an artifact from a pattern source) or it accesses a data structure or memory to obtain the image. The image may be of all or a portion of an entire fingerprint. Sometimes a portion of a fingerprint image may appear to be a set of discrete curves. System 100 is a computing system (e.g., an embedded computing system, a general purpose computing system, a special purpose computing system, combinations thereof, including a stored program computing platform with a processor and a coupled memory storing executable instructions) having a large number of suitable implementations for accessing and processing resources fingerprints, fingerprint images, portions of fingerprint images, and sets of curves derived from a fingerprint. Sensors that may be used with system 100 include charge-coupled devices (CCD), complementary metal oxide semiconductor (CMOS), capacitive, thermal, optical, electro-optical, RF modulation, acoustic, or other image sensing devices, such as those available from a wide range of manufacturers including IDEX ASA, Fujitsu, Atmel, Apple, Synaptics, Infineon, Sony, Integrated Biometrics, and Fingerprint Cards for example. Image arrays may be relatively small (e.g., 50×50 pixels, 128×128 pixels to a CIF size of 352×288 pixels or larger), each pixel having a pixel depth of but not limited to eight bits. System 100 uses a fingerprint image produced from device 105. In some cases, device 105 may preprocess images, such as performing image keystone corrections (a geometric correction used to account for optical distortions associated with optical/prism based systems when returning an image size proportionate to fingerprint size or image reconstruction to assemble an image taken in bands as a finger is 'swiped' across the sensor.

An operating system runs on processor 110, providing control and coordinating the functions of the various components of system 100. The operating system may be one of the commercially available operating systems such as Microsoft (e.g., windows), Apple (e.g., IOS or Mac OS X), Google (e.g., Chrome or Android), as well as UNIX and AIX operating systems, though some embodiments may use a custom control for providing minimal, tailored functions. Custom programs, controlled by the system, include sets of instructions executable on processor 110 that are moved into and out of memory. These sets of instructions, when executed by processor 110, perform the methods and automated machine-implemented processes described herein. Device 105, I/O communication system 115, and memory system 130 are each coupled to processor 110 via a bus and with memory system 130 including a Basic Input/Output System (BIOS) for controlling the basic system functions.

I/O system 115 interconnects system 100 with outside devices or networks, enabling the system to communicate with other such systems over a communications system (e.g., directly wired, Local Area Network (LAN) or Wide Area Network (WAN), which includes, for example, the Internet, the WEB, intranets, extranets, and other public and private networks, wired, optical, or wireless). The terms associated with the communications system are meant to be generally interchangeable and are so used in the present description of the distribution network. I/O devices may also be connected to the system bus via I/O system 115. A keyboard, a pointing device (e.g., mouse, trackball or other device) and a display or indicator may be interconnected to system 100 through I/O system 115. It is through such input devices that the user may interactively relate to the programs for manipulating the resources, images, subsystems, processes and system according to the present invention. By using the aforementioned I/O devices, a user is capable of inputting information to the system through the keyboard or mouse and receiving output information from the system. System 100 may contain a removable memory component for transferring data, for example images, maps, instructions, templates, or programs.

In use, system 100 processes a set of pattern images from a pattern source (e.g., a fingerprint) to compare and evaluate an image of the pattern source, for example, against a set of patterns stored in and retrieved from memory 130. Optionally, system 100 provides the user with feedback regarding a status and/or quality of the image reconstruction to aid in realtime impression gathering.

I/O system 115 may optionally include a display, other output or a visualization/audiblization system that supports a visualization graphic derived from a match, a reconstruction image or provides some other indication or signal to the user regarding a state, status, message, or the like from a component of system 100.

Figure 2:
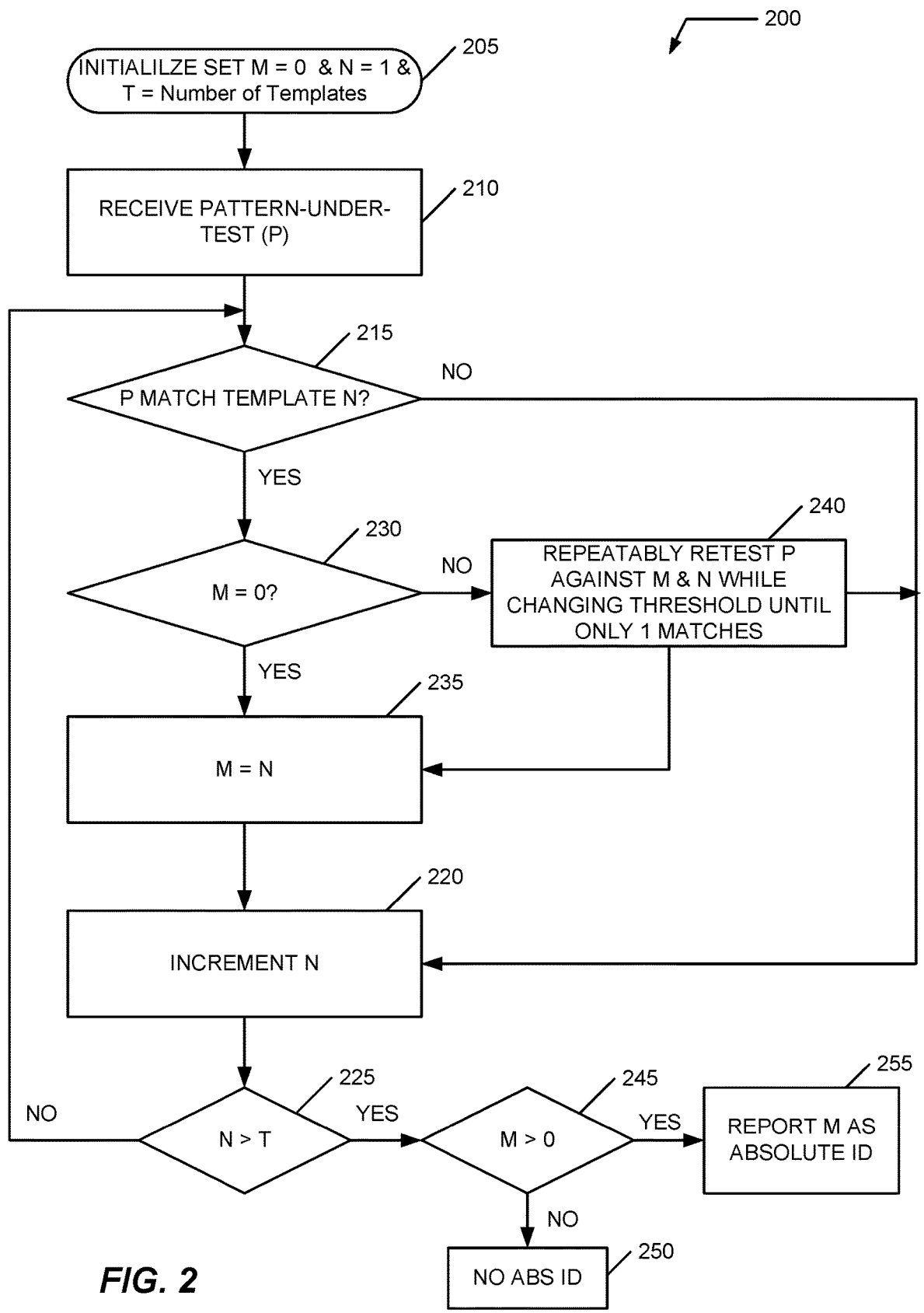
FIG. 2 illustrates a flow diagram of an embodiment for a matching process that determines a conforming pattern match to a pattern-under-test from a set of matching patterns in a pattern storage.

FIG. 2 illustrates a flow diagram of an embodiment for a matching process 200 that determines a conforming pattern match to a pattern-under-test from a set of matching patterns in a pattern storage. Matching process 200 includes a set of steps, a step 205-a step 255. As illustrated, matching process 200 operates with a set of patterns stored in a pattern memory (e.g., memory 130 of FIG. 1). Memory 130 may include a trusted memory portion where validated patterns are placed once they are registered.

The set of patterns are further organized into pattern templates, each pattern template representing one validated pattern. Each pattern template includes various template elements. For example, a first template may represent a right index finger of a first user. The first template may include various pattern elements based upon the specific model implemented by the system. For example, in some cases, first template information may include detailed information about minutiae developed from an image of the right index finger of the first user. Other models may represent content of the image using pattern components of interest (e.g., points, curves, segments, or other pattern features). The matching process and matching engine are compatible with the specific model used to organize and represent the templates. Thus the specifics of the operation of a matching process or of the matching engine may vary, the overall function is to compare a pattern-under-test (P) with another pattern, such as a specific pattern retrieved from pattern memory. Each template represents one particular pattern, but that particular pattern may include a set of template elements that represent the particular pattern appropriate for the selected model.

A step 205 of matching process 200 initializes a set of parameters for use. This set of parameters may include a set of variables M=0, N=1, and T=number of templates. At a conclusion of process 200, parameter M will represent an absolute identification (ID) for the single conforming matching template of the set of templates. Parameter N represents an index that increments from 1 to T for process 200 to operate on each and every template in pattern storage.

After step 205, process 200 performs a step 210 to receive a pattern-under-test (P). As noted herein, there are many ways system 100 may be used by process 200 to receive P. P may be accessed in realtime, near realtime, processed from a data store including previously received patterns-under-test, or some other collection mechanism.

After step 210, process 200 performs a step 215 to test whether pattern-under-test P matches the pattern defined by template number N (with N=1 for the first pass). Various matching processes and match engines appropriate to the pattern-under-test P and template information may be used to evaluate the test at step 215.

When the test at step 215 is negative (e.g., NO), process 200 branches to a step 220 increment N (e.g., N=N+1). Step 215 describes one manner of testing pattern-under-test P against the set of all registered patterns. In some cases, process 200 may decrement through this set, or may randomly select patterns from the set. The particulars of the manner of performing this set-wide test may be varied, as long as each pattern from the set is tested and duplicate testing is reduced/eliminated.

After step 220, process 200 performs a test at a step 225 to test whether index N is greater than T, the number of templates to be tested.

When the test at step 225 is negative (e.g., NO), process 200 branches back to step 215 to test whether pattern-under-test P matches template N as before, except N now identifies a different template. Process 200 continues to perform steps 215-step 225 and serially evaluate pattern-under-test P against each template until the test at step 215 is affirmative (e.g., YES).

When the test at step 215 is affirmative (YES), process 200 branches to a step 230 to test whether parameter M is zero (M=0?). When M=0, the initialized value of M, the process 200 determines that the affirmative result of test 215 is the first time match of pattern-under-test P to a template (template number N in this case).

When the test at step 230 is affirmative (e.g., YES), then process 200 performs a step 235 to set M equal to N (M=N). After step 235, process 200 performs step 220 as described herein.

When the test at step 230 is negative (e.g., NO), then process 200 performs a step 240. The negative result at step 230 indicates that there had been at least one prior match of pattern-under-test P to a template. Step 240 evaluates the pattern-under-test P against both the previously matched pattern (identified by the current value of M) and against the current matched pattern (identified by the current value of N). There may be many ways to determined which pattern (the pattern from template M or the pattern from template N) is a better match to pattern-under-test.

In step 240, a match engine that employs a variable threshold may be used to increase the variable threshold and perform matches of both patterns against pattern-under-test P until step 240 determines which of the two patterns meets the conforming standard (e.g., for a ranking conformance standard seeking the best matching, the result of step 240 is that the conforming standard is "best"). Step 240 sets M equal to the template number of the conforming matching pattern. These possibilities are illustrated in this implementation by the two different paths from step 240. After step 240 when the previous Mth template is the more conforming match, process 200 processes step 220 as described herein. However, after step 240 when the new Nth template is the more conforming match, process 200 processes step 235 as described herein.

While process 200, in this example, is implemented such that step 240 identifies a single most conforming pattern, in some implementations it may be desirable to also know the penultimate conforming pattern. Or in other cases, it may be desired to rank a set of registered patterns according to their specific conformance to the conformance standard. For example, when looking for the best matching pattern, step 240 may maintain a list ranking some or all of the registered patterns.

Process 200 continues to execute step 205 through step 240, finding the single pattern that conformably matches pattern-under-test P until the test at step 225 is affirmative (e.g., YES) and index N has been incremented to a value greater than the total number of templates T. At this point, parameter M represents the template number of the single conforming matching pattern, providing that the test at step 215 was affirmative at least once.

After the test at step 225 is affirmative, process 200 executes a step 245 to test whether parameter M is greater than its initialized value (e.g., whether M>0).

When the test at step 245 is negative (e.g., NO) then process 200 executes a step 250 which provides an indication that there is no absolute ID (i.e., no matches) available for the given pattern-under-test P and the templates of the pattern memory used by process 200.

When the test at step 245 is affirmative (e.g., YES) then process 200 executes a step 255 which reports the parameter M as the absolute ID for pattern-under-test P, the single conforming matching pattern from the set of templates.

In summary, matching process 200 produces an absolute ID, an identification of a single conforming matching template that represents the stored pattern that conformably matches pattern-under-test P, if one is available. Process 200 performs a serial match test of each template against pattern-under-test P until there each template has been tested. The results may include no matches, a single match, or multiple matches.

In the case of multiple matches, process 200 identifies which of the matching templates conformably matches pattern-under-test P. While there may be many ways to perform this identification, process 200 represents one way which performs a head-to-head comparison between any new match of a template against the previous single conforming matching template. The outcome of this head-to-head comparison identifies the current single conforming matching template. Each time a new match is found after the first match, this head-to-head testing is performed. When all the templates have been tested, the latest single conforming matching template represents the single conforming matching template from all the tested templates.

Process 200 may be implemented in other ways in addition to, or alternatively to, step 205-step 255. For example, process 200 may perform multiple match cycles, each cycle performed at different thresholds. During each cycle, all those templates that match pattern-under-test P for the particular threshold may be put into an array, to be evaluated in a following cycle using a different threshold to produce a new array. The process may be continued until the array includes a single template, which will be the single conforming matching template for the pattern-under-test.

In some instances, a single cycle may be performed by a matching engine that is able to quantify a match quality metric for each template with respect to pattern-under-test P. After each template is quantified, process 200 may establish that the template having the greatest match quality metric is the single conforming matching template.

In some implementations, process 200 may include a hybrid approach that includes an initial phase using the match quality metrics to identify an initial set of top-valued match quality metrics. Thereafter process 200 may perform a second phase in which head-to-head comparisons are made from the templates of the initial set to identify a single conforming matching template. In some cases, the phases may be reversed to use head-to-head comparisons to produce an initial set that is used with a quality match metric to identify the single conforming matching template.

Some patterns, templates, matching engines, and other design elements of an embodiment may be more appropriately evaluated using one of these solutions. In other embodiments, any of these solutions may be about equally feasible allowing more flexibility in providing an absolute ID of a single conforming matching template from a set of stored templates, particularly in those cases where the stored templates include multiple matching templates.

Also, an article of manufacture for use with a computer processor, such as a CD, pre-recorded disk or other equivalent devices, could include a computer program storage medium and program mechanisms recorded thereon for directing the computer processor to facilitate the implementation and practice of the above described methods. Such devices and articles of manufacture also fall within the spirit and scope of the present invention.

The invention may be implemented in numerous ways, including for example as a method (including a computer-implemented method), a system (including a computer processing system, general purpose, special purpose, hybrid, embedded, and the like), an apparatus, a computer readable medium, a computer program product, a graphical user interface, a web portal, or a data structure tangibly fixed in a computer readable memory. Several embodiments of the present invention are discussed herein. The appended drawings illustrate only typical embodiments of the present invention and therefore are not to be considered limiting of its scope and breadth. The system, methods, and computer-program products have been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

System 100 includes a computer program product or software that is stored on or in a non-transitory processor readable medium. Current examples of a processor readable medium include, but are not limited to, an electronic circuit, a semiconductor memory device, a ROM, a flash memory, an erasable programmable ROM (EPROM), a floppy diskette, a compact disk (CD-ROM), an optical disk, a hard disk, and a fiber optic medium. As will be described more fully herein, the software can include a plurality of modules for performing system tasks such as performing the methods previously described herein. A processor interprets instructions to execute the software, as well as, generates automatic instructions to execute software for system responsive to predetermined conditions. Instructions from both the user interface and the software are processed by the processor for operation of system 100. In some embodiments, a plurality of processors can be utilized such that system operations can be executed more rapidly.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the conforming mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A method for selecting a single conforming match pattern template from a set of at least two pattern templates that match a pattern-under-test using an initial match threshold and a conformance standard, the method comprising:
   a) identifying, using a processor, an initial set of more than one matching template from the set of pattern templates using a matching engine responsive to the initial match threshold and the conformance standard, said initial set of matching templates defining a previous set of matching templates and said initial match threshold defining a previous match threshold, said matching engine included in a digital pattern matching system having said processor executing instructions retrieved from a memory;
   b) identifying, using said processor, a subsequent set of matching templates from said previous set of matching templates using said matching engine responsive to a subsequent match threshold, wherein each of the templates of said subsequent set of matching templates are included in said previous set of matching templates, and wherein each template of the previous set of matching templates that does not satisfy the subsequent match threshold is excluded from the subsequent set of matching templates, said subsequent match threshold adjusted with respect to said previous match threshold responsive to the conformance standard;
   c) repeating step b) using said processor until a number of elements of said subsequent set of matching templates equals one and said subsequent set of matching templates includes a particular one template from the set of pattern templates, wherein said previous match threshold includes said subsequent match threshold from step b) when said number of elements of said subsequent set of matching templates is greater than one and said step b) is repeated; and
   d) identifying, using said processor, said particular one template as the single conforming match pattern template.

2. The method of claim 1 wherein said conformance standard includes a ranking standard having matches of different ranks and wherein each said match threshold produces a different rank.

3. The method of claim 2 wherein said ranking standard includes a best matching standard and wherein said different ranks includes a better matching threshold.

4. The method of claim 2 wherein said ranking standard includes a worst matching standard and wherein said different ranks includes a lesser matching threshold.

5. A method for producing a conforming match pattern from a set of patterns that matches a pattern-under-test using a conformance standard, the method comprising:
   a) testing, using a processor coupled to a matching engine, each pattern from the set of patterns for a match against the pattern-under-test until an initial termination event occurs, said initial termination event including (i) a first no-match mode having no pattern from the set of patterns matching the pattern-under-test or (ii) a first match mode having a first particular one pattern from the set of patterns matching the pattern-under-test, wherein a current particular one pattern includes said first particular one pattern, said matching engine included in a digital pattern matching system having said processor executing instructions retrieved from a memory;
   b) reporting, using said processor responsive to said initial termination event including said first no-match mode, the single conforming match pattern consists of a null pattern;
   c) testing, using said processor responsive to an immediately preceding termination event including one of said first match modes, each untested pattern not tested in step a) for a match against the pattern-under-test until a subsequent termination event occurs, said subsequent termination event selected from one of (i) a second match mode having a subsequent particular one pattern from the set of patterns matching the pattern-under-test and (ii) a second no-match mode having no untested pattern from the set of patterns matching the pattern-under-test, wherein said subsequent particular one pattern is different than said first particular one pattern;
   d) determining, using said processor responsive to an immediately preceding termination event including said second match mode, which one of said subsequent particular one pattern and said current particular one pattern is a current conforming match to the pattern-under-test wherein said current particular one pattern consists of said current conforming match;
   e) repeating steps c) and d) using said processor until an immediately preceding termination event includes said second no-match mode; and
   f) reporting, using said processor responsive to an immediately preceding termination event including said second no-match mode, said current particular one pattern as the single conforming match pattern.

6. The method of claim 5 wherein each said testing step includes matching a pair of patterns using a matching process including a variable match threshold, wherein said testing step a) includes said variable match threshold having an initial value, and wherein said testing step c) includes said variable threshold having a subsequent value greater than said initial value.

7. The method of claim 6 wherein repeating step e) increases said subsequent value each time steps c) and d) are repeated.

8. A method for producing a single conforming match pattern template from a set of pattern templates, the single conforming match pattern conforming matching a pattern-under-test, the method comprising:
   a) initializing, using a processor coupled to a matching engine, a set parameters including a number M, a number N, and a number T with said number M representing a current conforming template match having an initial template number with a template value other than 1 through said number T, said number N representing an index, and said number T representing a number of the pattern templates in the set of pattern templates, said matching engine included in a digital pattern matching system having said processor executing instructions retrieved from a memory;
   b) retrieving, using said processor, a pattern-under-test P;
   c) testing, using said processor, whether said pattern-under-test P matches an Nth template to produce a first test state, with said first test state being affirmative when P matches said Nth template and with said first test state being negative when said P does not match said Nth template;
   d) testing, using said processor, when said first test state is affirmative, whether said number M has said initial template value to produce a second test state, with said second test state being affirmative when M has said initial template number and with said second test state being negative when M has a value different from said initial template number;
   e) setting, using said processor, when said first state and said second state are both affirmative, said number M equal to said number N;
   f) testing, using said processor, when said first state is affirmative and said second state is negative, said pattern-under-test P against both said Mth template and said Nth template to determine a current conforming match, wherein the current conforming match is said Mth template when said Mth template matches said pattern-under-test P better than said Nth template, and wherein said current conforming match is said Nth template when said Nth template matches said pattern-under-test P better than said Mth template, wherein said number M is set to represent said current conforming match;
   g) incrementing, using said processor, after step c) when said first state is negative, after step e), and after step f), said number N by one to produce an incremented number N;
   h) testing, using said processor, whether said incremented number N is greater than said number T to produce a third test state, said third test state being negative when said incremented number N is not greater than said number T and said third test state being affirmative when said incremented number N is greater than said number T;
   i) repeating, when said third test state is negative, step c) through step h) using said processor; and thereafter
   j) reporting, using said processor, when said third test state is affirmative and when said number M is different than said initial template number, said number M as the single conforming match pattern template.

9. A non-transitory computer-readable medium for selecting a single conforming match pattern template from a set of at least two pattern templates that match a pattern-under-test using an initial match threshold and a conformance standard, the non-transitory computer-readable medium comprising instructions that are executable by at least one processor to perform the steps of:
  a) identifying, using the at least one processor coupled to a matching engine, an initial set of more than one matching template from the set of pattern templates using a matching engine responsive to the initial match threshold and the conformance standard, said initial set of matching templates defining a previous set of matching templates and said initial match threshold defining a previous match threshold, said matching engine included in a digital pattern matching system having said processor executing instructions retrieved from a memory;
  b) identifying, using the at least one processor, a subsequent set of matching templates from said previous set of matching templates using said matching engine responsive to a subsequent match threshold, wherein each of the templates of said subsequent set of matching templates are included in said previous set of matching templates, and wherein each template of the previous set of matching templates that does not satisfy the subsequent match threshold is excluded from the subsequent set of matching templates, said subsequent match threshold adjusted with respect to said previous match threshold responsive to the conformance standard;
  c) repeating step b) using the at least one processor, until a number of elements of said subsequent set of matching templates equals one and said subsequent set of matching templates includes a particular one template from the set of pattern templates, wherein said previous match threshold includes said subsequent match threshold from step b) when said number of elements of said subsequent set of matching templates is greater than one and said step b) is repeated; and
  d) identifying, using the at least one processor, said particular one template as the single conforming match pattern template.

* * * * *